US012727705B2

(12) United States Patent
Pugliese et al.

(10) Patent No.: US 12,727,705 B2
(45) Date of Patent: Sep. 8, 2026

(54) CAPSULE HOLDER FOR HOLDING A CAPSULE

(71) Applicant: SOCIETE DES PRODUITS NESTLE S.A., Vevey (CH)

(72) Inventors: Alexandre Pugliese, Paudex (CH); Alexandre Perentes, Sullens (CH); Xavier Richi, Morges (CH); Lucio Scorrano, Yverdon-les-Bains (CH)

(73) Assignee: Société des Produits Nestlé S.A., Vevey (CH)

( * ) Notice: Subject to any disclaimer, the term of this patent is extended or adjusted under 35 U.S.C. 154(b) by 841 days.

(21) Appl. No.: 18/005,252

(22) PCT Filed: Jul. 13, 2021

(86) PCT No.: PCT/EP2021/069386
§ 371 (c)(1),
(2) Date: Jan. 12, 2023

(87) PCT Pub. No.: WO2022/013175
PCT Pub. Date: Jan. 20, 2022

(65) Prior Publication Data

US 2023/0248172 A1 Aug. 10, 2023

(30) Foreign Application Priority Data

Jul. 15, 2020 (EP) .................................... 20185896

(51) Int. Cl.
*A47J 31/06* (2006.01)
*A47J 31/36* (2006.01)
(Continued)

(52) U.S. Cl.
CPC ....... *A47J 31/0668* (2013.01); *A47J 31/3676* (2013.01); *A47J 31/446* (2013.01); *A47J 31/46* (2013.01)

(58) Field of Classification Search
CPC .... A47J 31/0689; A47J 31/4492; A47J 31/52; A47J 31/3671; A47J 31/5253;
(Continued)

(56) References Cited

U.S. PATENT DOCUMENTS

2014/0170278 A1* 6/2014 Perentes ................ A47J 31/22
99/323

FOREIGN PATENT DOCUMENTS

EP 2000062 12/2008
EP 2000062 A1 * 12/2008
(Continued)

*Primary Examiner* — Phuong T Nguyen
(74) *Attorney, Agent, or Firm* — Thorpe North & Western, LLP

(57) ABSTRACT

The present invention is directed to a capsule holder (2) for holding a capsule (C) carrying a beverage component and for being attachable in an attachment direction (I) to a beverage preparation device (3) of a beverage preparation machine (1) for beverage production, the capsule holder (2) comprising a holder body (4) having a cavity (40) configured to receive a capsule (C) via an insertion opening (41), and a lock element (5) for fixing the capsule holder (2) to the beverage preparation device, wherein the lock element (5) and the holder body (4) are connected to each other so that i) the lock element (5) is rotatably moveable relative to the holder body (4) about a fixing axis (F), and ii) the holder body (4) is translationally moveable relative to the lock element (5) along the attachment direction (I). The present invention is further directed to a beverage preparation machine (1) comprising a capsule holder (2) according to the present invention and a beverage preparation device (3). Moreover, the present invention is further directed to a method for delivering a liquid through a beverage preparation machine (1) according to the present invention.

14 Claims, 7 Drawing Sheets

(51) Int. Cl.
*A47J 31/44* (2006.01)
*A47J 31/46* (2006.01)

(58) Field of Classification Search
CPC ...... A47J 31/3609; A47J 31/525; A47J 31/42; A47J 31/404; A47J 31/36; A47J 31/5255; A47J 31/34; A47J 31/545; A47J 31/24; A47J 31/30; A47J 31/5251; A47J 31/468; A47J 31/56; A23F 5/26
USPC ......... 99/293, 295, 279, 280, 281, 282, 283, 99/284, 291, 300
See application file for complete search history.

(56) References Cited

FOREIGN PATENT DOCUMENTS

| | | |
|---|---|---|
| WO | 2013007780 | 1/2013 |
| WO | 2015024798 | 2/2015 |

* cited by examiner

CAPSULE HOLDER FOR HOLDING A CAPSULE

CROSS REFERENCE TO RELATED APPLICATIONS

The present application is a National Stage of International Application No. PCT/EP2021/069386, filed on Jul. 13, 2021, which claims priority to European Patent Application No. 20185896.6, filed on Jul. 15, 2020, the entire contents of which are being incorporated herein by reference.

FIELD OF THE INVENTION

The present invention is directed to a capsule holder for holding a capsule carrying a beverage component and for being inserted in an attachment direction in a beverage preparation device of a beverage preparation machine for beverage production. The invention is further directed to a beverage preparation machine having the capsule holder and the beverage preparation device into which the capsule holder is selectively insertable. The present invention is further directed to a method for delivering a liquid through the beverage preparation machine, e.g. for the purpose of preparing a beverage or sanitizing the beverage preparation machine.

TECHNICAL BACKGROUND

Beverage preparation machines having a beverage preparation device with a removeable a capsule holder are known in the prior art. Via the capsule holder, a beverage component can be carried and functionally inserted into the beverage preparation device. Liquid transferred by the beverage preparation device is delivered through the capsule holder so as to interact with the beverage component carried along with the capsule holder to produce a beverage product. Interaction of the liquid, like water, with the beverage component, like tea or coffee, can for instance be infusion, extraction or dissolution of the beverage component by means of the liquid, or any other kind of corresponding interaction to produce a beverage product. To avoid residues remaining in the machine which may result in an unfavorable bacterial growth, sufficient and frequent cleaning and sanitization of the machine is required. Also, sealing of the liquid delivery path at the connection sections between the capsule holder and the beverage preparation device is required to obtain a most effective and safe beverage production.

SUMMARY OF THE INVENTION

It is thus an object of the present invention to provide a capsule holder, a beverage preparation machine with such a capsule holder as well as a method for delivering a liquid through such a beverage preparation machine, which allow for a safe and secure alignment of the capsule holder with respect to the beverage preparation device, hence preferably to obtain a safe and secure connection between these elements irrespective of operational factors, like the type of capsule used or the type of operation (beverage production, sanitization) performed.

According to a first aspect, the present invention is directed to a capsule holder for holding a capsule carrying a beverage component and for being attachable in an attachment direction to a beverage preparation device of a beverage preparation machine for beverage production (e.g. for being at least partly insertable in the attachment direction in the beverage preparation device). The capsule holder comprises a holder body having a cavity configured to receive a capsule via an insertion opening. The capsule holder further comprises a lock element for fixing or locking the capsule holder to the beverage preparation device. The lock element and the holder body are connected to each other so that i) the lock element is rotatably moveable relative to the holder body about a fixing axis, and ii) the holder body is translationally moveable relative to the lock element along the attachment direction.

The capsule holder according to the present invention thus allows for a rotatable lock movement of the lock element about the fixing access while at the same time the holder body is translationally moveable so as to allow self-alignment of the holder body relative to the lock element (and thus a beverage preparation device to which the capsule holder is attached/connected/locked/fixed) upon a fixing action of the capsule holder to the beverage preparation device. Hence, the holder body can be securely and safely attached to the beverage preparation device once the capsule holder is fixed thereto irrespective of a capsule being inserted in the cavity for beverage production or not inserted in the cavity for sanitization purposes. The capsule holder even may provide the self-alignment function for different types of capsules, e.g. having a different volume or thickness (e.g. of a rim portion of the capsule to be clamped between the capsule holder or its holder body on the one hand and the beverage preparation device on the other hand). This can all be obtained by the holder body being translationally moveable relative to the lock element along the attachment direction while the lock element allows for a corresponding locking action due to its relative rotational movement with respect to the holder body. Hence, even in a case in which no capsule is inserted, e.g. for sanitization purposes, the holder body can be brought into safe and secure alignment/contact with the beverage preparation device so as to allow for sanitization of the beverage preparation machine by corresponding liquid delivery through the whole system including the capsule holder not being loaded with a capsule.

The holder body can be translationally moveable relative to the lock element between a first translational position and a second translational position, such that the lock element and the holder body are more distant to each other along the attachment direction in the first translational position than in the second translational position. Hence, the translational mobility of the holder body relative to the lock element works for a defined translational range to allow for application of the self-alignment function in case of the capsule holder being or not being loaded with a capsule, and preferably also irrespective of the capsule's parameters, like volume or wall/rim thickness.

The lock element and the holder body can preferably be in abutment in the attachment direction when being in the second translational position. In other words, the holder body can be supported on the lock element in the second translational position to allow for an easier handling, e.g. when loading the cavity with a capsule and preferably also when handling the capsule holder, particularly before the capsule holder is attached to a beverage preparation device.

The holder body is preferably provided to be biased towards the first translational position or the attachment direction, more preferred by a spring member provided between the lock element and the holder body. Hence, the holder body is securely pushed or biased in a direction towards the beverage preparation device when being attached thereto, to allow the holder body always being in abutment with the beverage preparation device when being connected thereto to thus perform the self-alignment function in a secure and safe manner.

The lock element and the holder body can preferably be connected to each other so that the holder body is further swivelable, preferably freely swivelable (i.e. in every rotational degree of freedom), relative to the lock element, preferably at least in the first translational position. The swivelable connection allows for a full self-alignment function of the holder body with respect to the beverage preparation device in any desired degree of freedom. This at least in or towards the first translational position.

The lock element and the holder body may comprise cooperating rotational restriction structures for restricting the rotatable movement/mobility between the lock element and the holder body, this preferably between a mounting position for mounting (e.g. inserting) the capsule holder to (in) the beverage preparation device and a fixing position in which the capsule holder can be or is fixed to the beverage preparation device by the lock element, e.g. due to a screwing action thus being locked with a translational movement to the beverage preparation device. Hence, the two positions can be securely defined and attachment of the capsule holder to a beverage preparation device be facilitated.

The cooperating rotational restriction structures can be configured to allow the holder body to be translationally moveable and, if present, also swivelable relative to the lock element in a first relative rotational position, preferably the fixing position, and restrict or prevent the translational and, if present, the swivelable mobility of the holder body relative to the lock element in a second relative rotational position, preferably the mounting position. Hence, the self-alignment function can be securely provided, e.g., in a case of the capsule holder being attached and fixed to the beverage preparation device, while mobility between the capsule holder and the lock element be securely restricted or prevented in the second relative rotational position which may allow for an easy and secure insertion of a capsule while the capsule holder is detached from the beverage preparation device so as to facilitate the insertion of a capsule into the capsule holder and the handling of the capsule holder to be attached to the beverage preparation device. Therefore, in the second relative rotational position, the lock element and the holder body can preferably be in the second translational position. Moreover, in the first relative rotational position, the lock element and the holder body can preferably be in the first translational position.

The cooperating rotational restriction structures may comprise a pin element provided at one of the lock element and the holder body, and a guiding groove provided at the other one of the lock element and the holder body. The guiding groove may extend in a rotational direction about the fixing axis and may be configured to receive and guide the pin element upon the relative rotational movement between the lock element and the holder body about the fixing axis. Hence, a simple layout for securely guiding the lock element and the holder body relative to each other can be provided.

The guiding groove can transversely widen towards the first relative rotational position and/or the guiding groove can transversely taper towards the second relative rotational position. In other words, the guiding groove is provided such that due to it tapering towards the second relative rotational position it may function to restrict or prevent the translational and preferably also the swivelable mobility of the holder body relative to the lock element, while it allows—due to its widened layout about the attachment direction or fixing axis—a corresponding translational and, if present, swivelable mobility so as to release the holder body and thus provide the self-alignment function accordingly.

The lock element and the holder body may comprise cooperating guiding structures for guiding the relative translational movement between each other. Hence, a defined guidance and thus movability of the holder body with respect to the lock element can be provided even in the attachment direction to thus support the alignment function. This allows for a secure positioning of the holder body with respect to the beverage preparation device upon attachment of the capsule holder to the latter. The cooperating guiding structures preferably comprise a guiding pin provided at one of the lock element and the holder body, and a guiding recess provided at the other one of the lock element and the holder body for guidably receiving the guiding pin. In a most preferred embodiment, the guiding pin and the guiding recess preferably both extend parallel to the attachment direction to thus allow for a comparably large relative (translational) movability between the holder body and the lock element along the attachment direction.

The capsule holder, preferably the holder body, may further comprise a jaw for holding a capsule received in the cavity. The jaw preferably comprises a support section partly extending over the insertion opening when seen in the attachment direction. The jaw thus allows for easily and securely holding a capsule when being loaded, i.e. inserted or received in the cavity.

It is herein referred to a capsule to designate a closed receptable, pod or cartridge that may enclose a food or beverage ingredient or nutrient. Any type of capsule design may be conceived according to the design of the capsule holder. The capsule may have a rigid housing or not. It may be made of any material compatible with its function, like recyclable, biodegradable or compostable material.

In a preferred embodiment, the jaw can be connected to the holder body to be moveable, preferably pivotable, between a lock position in which the support section partly extends over the insertion opening when seen in the attachment direction to hold a capsule received in the cavity, and a release position in which the support section clears the insertion opening when seen in the attachment direction to allow a capsule received in the cavity be ejected out of the cavity preferably in a direction parallel to the attachment direction. Hence, the jaw can be attached to the holder body in an easy but effective manner with respect to its function for holding the capsule on the one hand and for easily ejecting the latter on the other hand.

The jaw can be preferably provided to be biased towards the lock position, this more preferred by a spring element provided between the jaw and the holder body. Hence, the jaw is securely held in the closed—i.e. lock—position so that the capsule cannot accidentally fall out of the capsule holder and is thus securely held therein even during handling of the (detached) capsule holder.

If both are present, the spring element and the spring member can preferably be coaxially arranged, more preferred in a row along or parallel to the attachment direction. Hence, the layout of the capsule holder can be simplified and made compact.

The capsule holder or the lock element can preferably comprise an actuator for moving the jaw between the release and the lock position, and preferably at least to the release position more preferred against the spring force of the spring element (and preferably, e.g. if arranged in a row, also against the spring force of the spring member). Hence, ejection of the capsule can be facilitated by simply providing an actuator, preferably in the form of a simple push button. Moreover, as both the forces of the spring member and that of the spring element need to be applied by a user onto the push-button or other type of actuator, an accidental ejection of the capsule can be avoided.

Preferably, the spring member, if present, can be supported between the actuator on the one hand and the holder body or the jaw on the other hand. Hence, the spring member can be securely supported between the two relatively moveable elements in a secure and simple manner.

The actuator can preferably be supported on or in the lock element most preferred by a spring force of the spring element and/or of the spring member when the jaw is in the lock position. Hence, the actuator is securely seated in the capsule holder, namely the lock element, and therefore easily accessible for a user at any time.

The actuator can preferably be guidably received in the capsule holder, preferably in the lock element, to be guided when being moved between the lock position and the release position. This can, for instance, be achieved by the lock element having a through opening for receiving a part of the actuator, the through opening having the form of the contour of the actuator in the received section (e.g. circular) so that the actuator when being pushed into the capsule holder is securely guided due to the cooperating contours. Hence, the operation of the actuator for a user can be facilitated.

The lock element can be provided opposite to the insertion opening. Hence, the lock element can cover the outer section of the capsule holder when being attached to a beverage preparation device. Hence, the capsule holder can be easily attached to a beverage preparation device as the lock element is easily accessible. Also, in case the actuator is provided in the lock element, the actuator can also be easily accessed and thus manipulated by a user.

The lock element can comprise a locking structure, like a thread or a part of a bayonet lock structure, for fixing the capsule holder to the beverage preparation device preferably by form fit connection. Hence, the capsule holder can be easily attached to the beverage preparation device, e.g., by a simple screw action.

The fixing axis may extend in a direction being parallel to the attachment direction. Hence, the capsule holder can be easily carried by a user and then simply attached, e.g. to the beverage preparation device, by a rotational movement about the fixing axis and the attachment direction.

The insertion opening is preferably facing towards the attachment direction so that attachment of the capsule holder with a capsule, if inserted, or at least the cavity ahead is provided and thus the whole layout and attachment is facilitated.

The cavity may have a cross-section being non cylindrically symmetric and/or non cyclically symmetric. For example, the cavity may have an egg-like cross-section to allow for a unique orientation of the capsule holder and thus of the capsule with respect to the beverage preparation device.

According to another aspect, the present invention is further directed to a beverage preparation machine comprising a capsule holder according to the present invention as well as a beverage preparation device. The beverage preparation device comprises a receiving section for receiving the capsule holder, a liquid delivery device for delivering liquid into the cavity or the capsule holder when being attached to, e.g. received in, the receiving section, preferably for preparing a beverage product by interaction with a beverage component carried within the cavity preferably via a capsule, a liquid discharge device for discharging the delivered liquid, preferably the prepared beverage product, out of the cavity of the capsule holder when being attached to, e.g. received in, the receiving section, and optionally a gas evacuation device for evacuation gas, like air, out of the cavity of the capsule holder when being attached to, e.g. received in, the receiving section, preferably upon beverage production or liquid delivery into the cavity or capsule (e.g. for the purpose of beverage production or sanitization).

By use of the capsule holder according to the present invention, a beverage preparation machine is provided which allows for a self-alignment function of the capsule holder when being attached to, e.g. received in, the beverage preparation device. This comes along due to the above-described translational and, if present, swivelable mobility of the holder body with respect to the lock element preferably at least in the fixing position.

According to a further aspect, the present invention is also directed to a method for delivering a liquid through a beverage preparation machine, comprising:

- providing a beverage preparation machine according to claim 14,
- optionally inserting a capsule in the cavity of the capsule holder,
- mounting the capsule holder to the receiving section, preferably by at least partly inserting the capsule holder in the receiving section, preferably with the lock element and the holder body in the mounting position,
- fixing the capsule holder by means of the lock element, preferably by a relative rotational movement about the fixing axis like a screwing action, to the beverage preparation device, preferably to the receiving section,
- upon fixing and preferably also mounting (e.g. insertion) of the capsule holder, alignment of the holder body to the beverage preparation device, preferably the receiving section, by the holder body's translational and, if present, also swivelable mobility relative to the lock element,
- delivering a liquid, like water for beverage production or a sanitizing liquid, into the cavity or, if present, into the capsule, via the liquid delivery device,
- preferably, upon delivery of the liquid, evacuating gas, like air, out of the cavity of the capsule holder or, if present, the capsule, via the gas evacuation device,
- discharging the delivered liquid, preferably the prepared beverage product or the used sanitizing liquid, out of the cavity of the capsule holder via the liquid discharge device, and
- after having finished the liquid delivery and discharge, releasing the lock element from the beverage preparation device, preferably from the receiving section, and removing the capsule holder from the beverage preparation device, and optionally, if present, ejecting the used capsule out of the cavity.

By the method according to the present invention, self-alignment of the capsule holder is obtained when being attached to, e.g. received in, the beverage preparation device, irrespective of a capsule being loaded in the cavity and the operation (e.g. beverage production, sanitization, etc.) be performed.

BRIEF DESCRIPTION OF DRAWINGS

Further features, details and advantages of the present invention will now be described by the embodiments of the enclosed figures.

DETAILED DESCRIPTION

Figure 2:
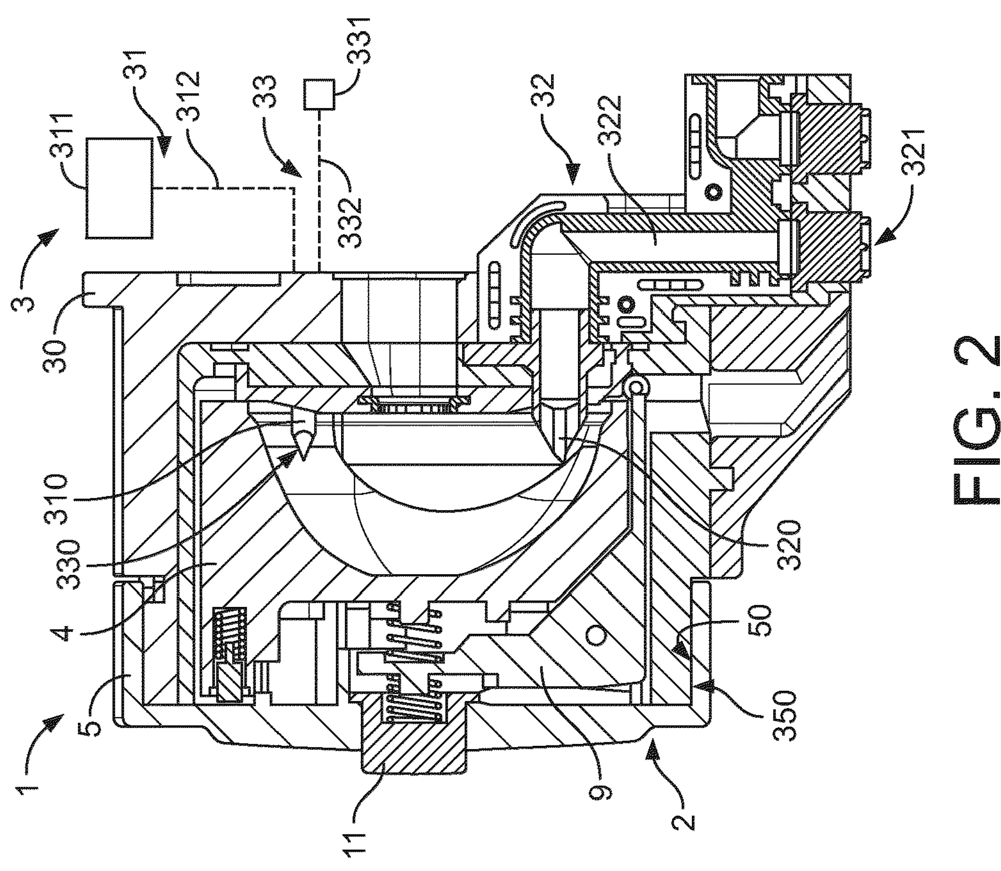
FIG. 2 shows a cross sectional side view along lines A-A of FIG. 1.
Figure 1:
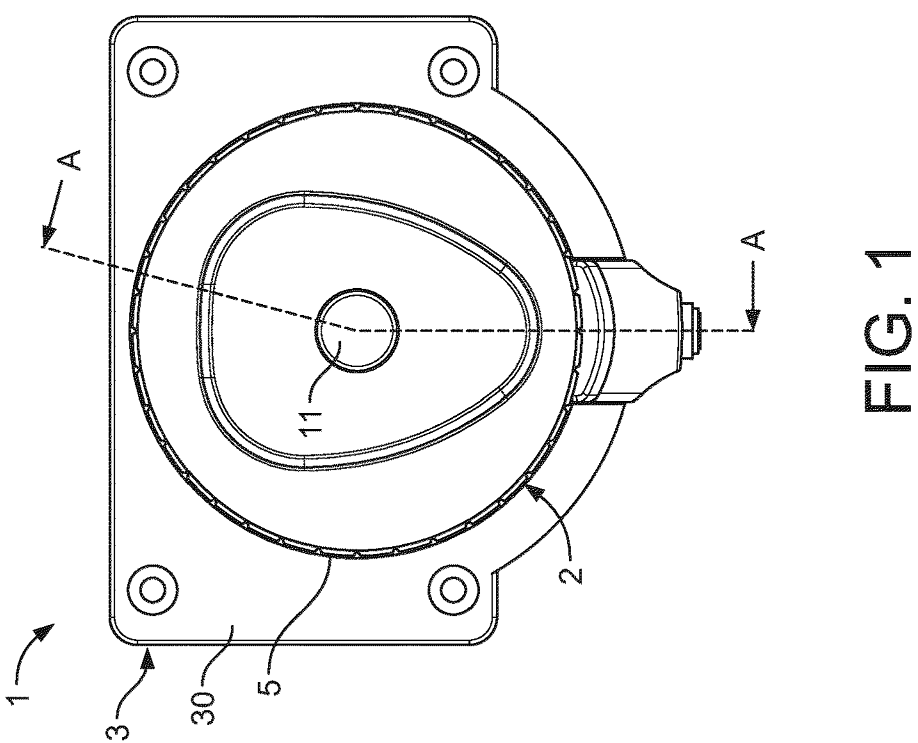
FIG. 1 shows a front view of a part of a beverage preparation machine according to an embodiment of the present invention.

The figures show an embodiment of a beverage preparation machine 1 and particular details and parts thereof. The beverage preparation machine 1 is provided to prepare a beverage usually from a capsule C carrying a beverage component, like coffee, tea, soup or other beverage or comestible components. The beverage preparation machine 1 is configured to allow interaction of a liquid, like water, with the beverage component, e.g. by way of infusion, extraction, dissolution and the like to thus prepare a beverage or comestible product.

The beverage preparation machine 1 comprises a capsule holder 2 and a beverage preparation device 3. The capsule holder 2 being an individual part of the present invention and will be described in the following in more detail.

The capsule holder 2 is provided or configured for holding a capsule C carrying a beverage or comestible component. The capsule holder 2 is further provided or configured for being attachable in an attachment direction I to the beverage production device 3 of the beverage preparation machine 1 for beverage production; e.g. preferably provided or configured for being at least partly insertable in the attachment direction I in the beverage production device 3. The capsule holder 2 comprises a holder body 4 having a cavity 40 configured to receive a capsule C via an insertion opening 41. Here, the insertion opening 41 is facing towards the attachment direction I and thus facing the beverage preparation device 2 when being attached thereto or inserted therein.

As can be clearly seen in the figures, the cavity 40 can have a cross-section being non cylindrically symmetric and/or non cyclically symmetric. In the shown embodiment, the cross-section of the cavity 40 has an egg-shape to thus provide a unique orientation for a capsule C to be inserted. Preferably, the capsule C has the same contour or cross-sectional layout so that the user can easily insert the capsule C in the correct orientation.

Moreover, the capsule holder 2 further comprises a lock element 5 for fixing or locking the capsule holder 2 to the beverage preparation device 3. The lock element 5 is preferably provided opposite to the insertion opening 41 as exemplarily shown in the figures. Hence, the lock element 5 can be used at the same time as an outer cover for the capsule holder 2 to thus securely cover the rear side of the capsule holder 2.

The lock element 5 and the holder body 4 are connected to each other so that the lock element 5 is rotatably moveable relative to the holder body 2 about a fixing axis F, and the holder body 2 is translationally moveable relative to the lock element 5 along the attachment direction I. The lock element 5 may therefore comprise a locking structure 50, like a thread or a part of a bayonet lock structure, for fixing the capsule holder 2 to the beverage preparation device 3, e.g., by form fit connection. Of course, other types of connection, like frictional connection, are generally possible for the lock element 5 in addition or alternatively.

The fixing axis F may extend in a direction being parallel to the attachment direction I and they are preferably coaxially arranged thus facilitating the overall layout and functionality of the capsule holder 2.

Figure 7:
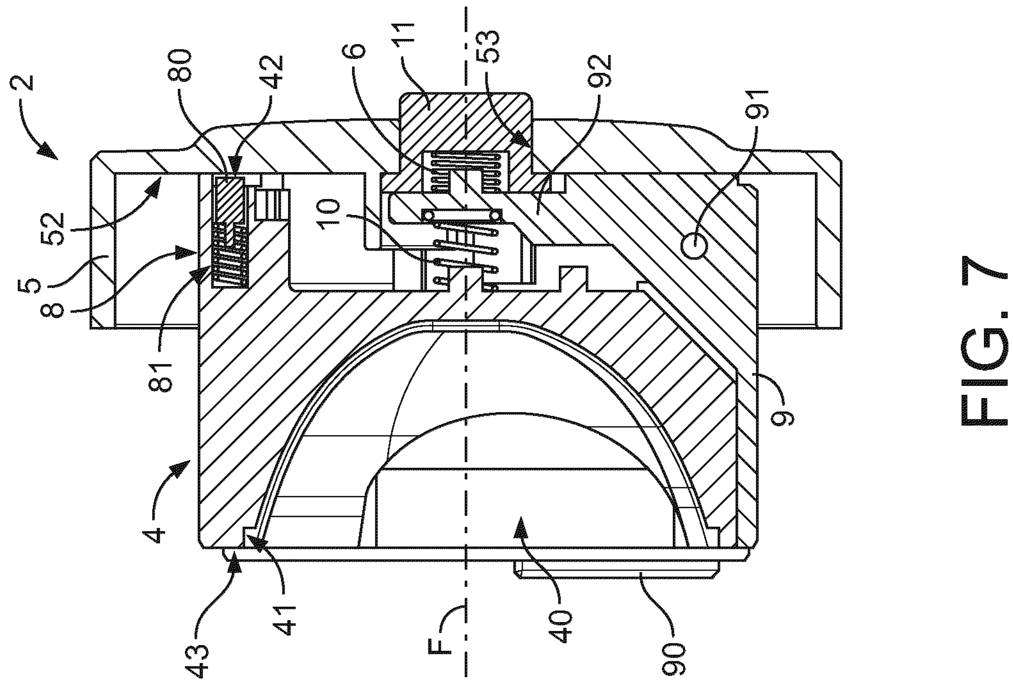
FIG. 7 shows a cross sectional side view along line A-A of FIG. 5 of the capsule holder according to FIG. 6.
Figure 6:
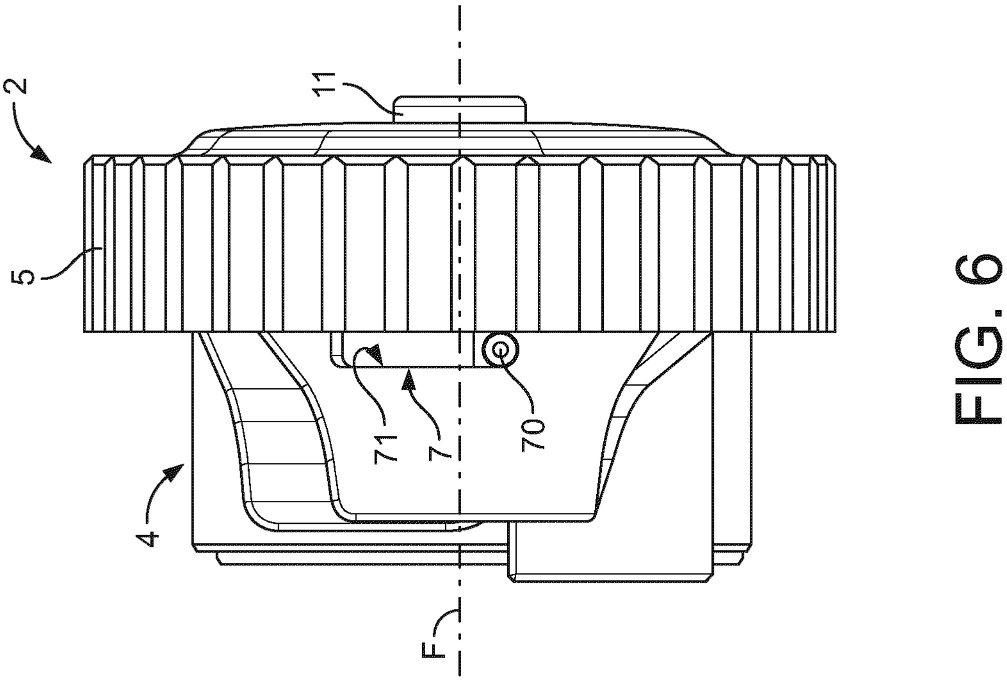
FIG. 6 shows a perspective side view of the capsule holder according to FIG. 5 in the second relative rotational positon and with the jaw in the lock positon.
Figure 9:
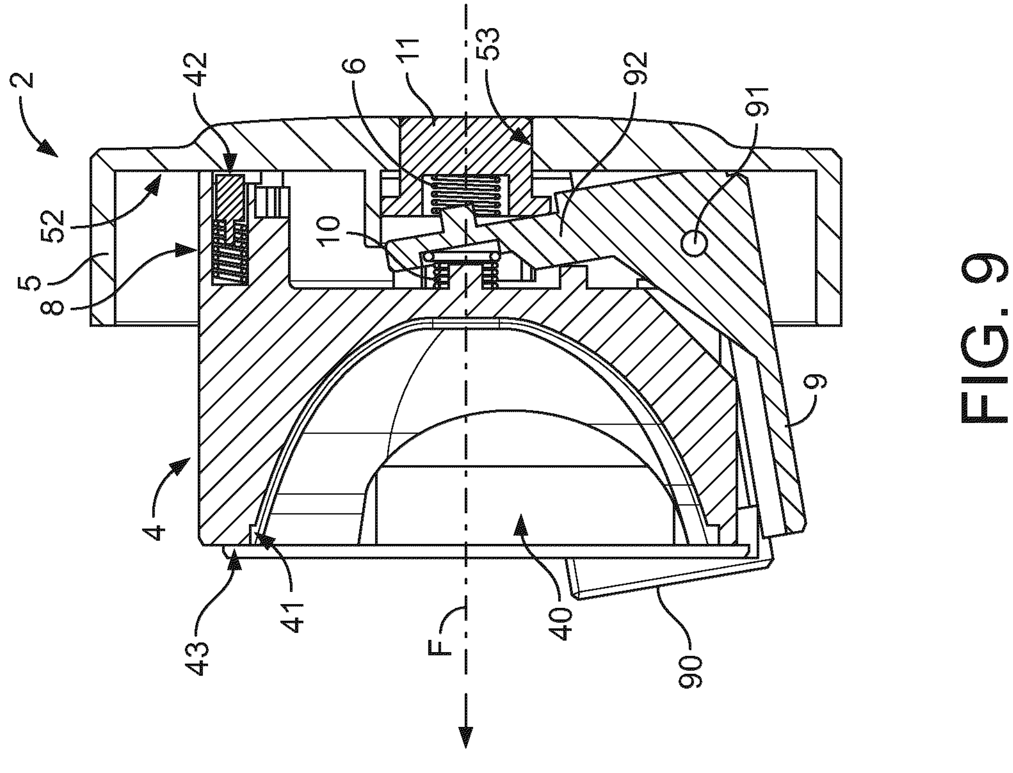
FIG. 9 shows a cross sectional side view along line A-A of FIG. 5 of the capsule holder according to FIG. 8.
Figure 8:
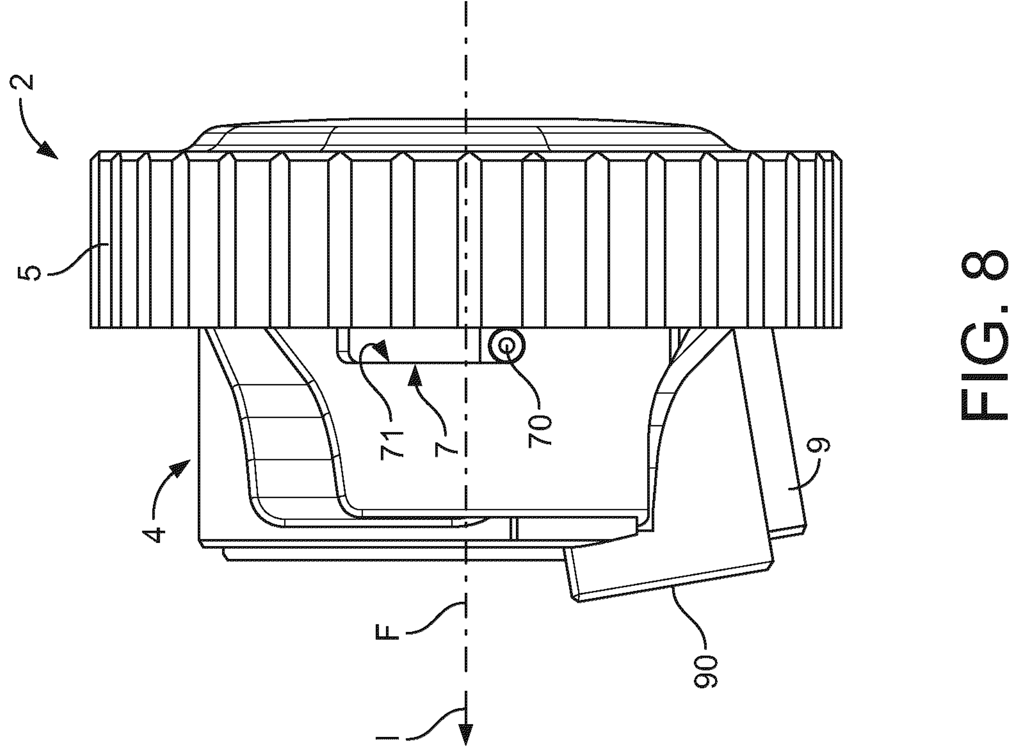
FIG. 8 shows a perspective side view of the capsule holder according to FIG. 5. in the second relative rotational positon and with the jaw in the release positon.
Figure 11:
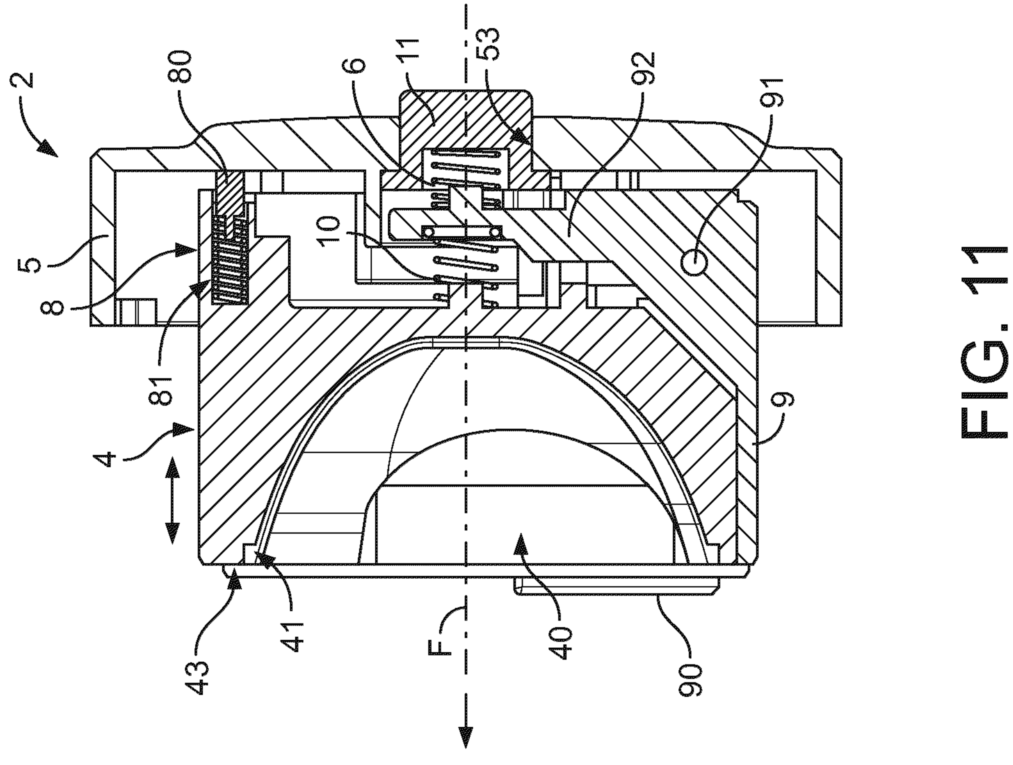
FIG. 11 shows a cross sectional side view along line A-A of FIG. 5 of the capsule holder according to FIG. 10.
Figure 10:
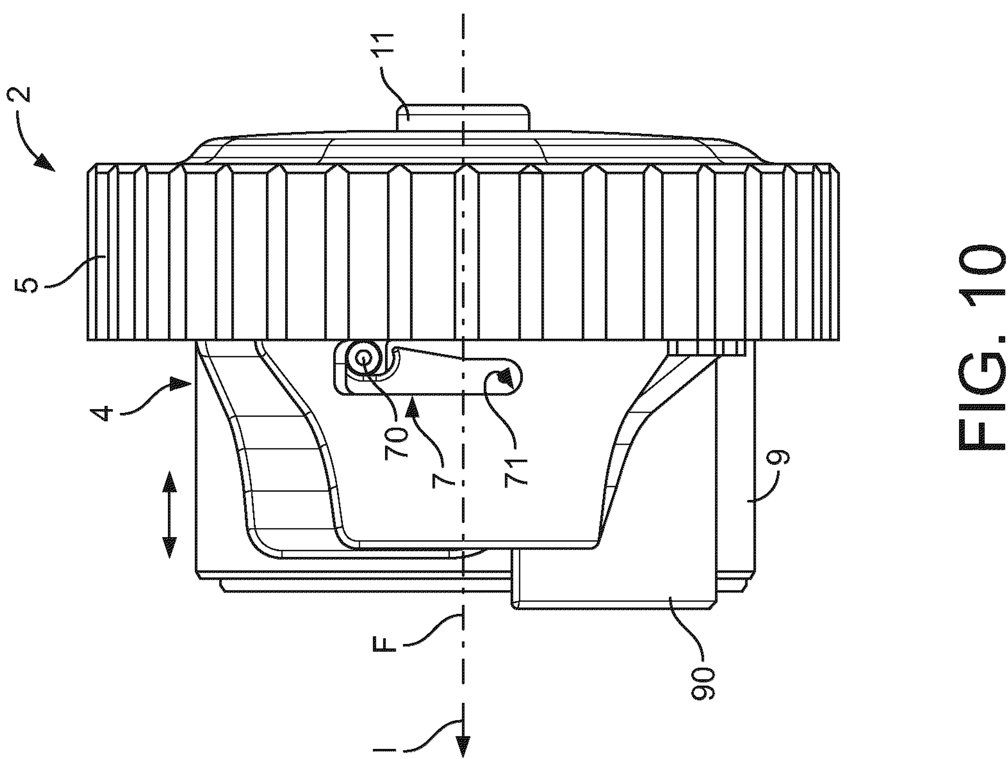
FIG. 10 shows a perspective side view of the capsule holder according to FIG. 5 in the first relative rotational position and with the jaw in the lock position.
Figure 13:
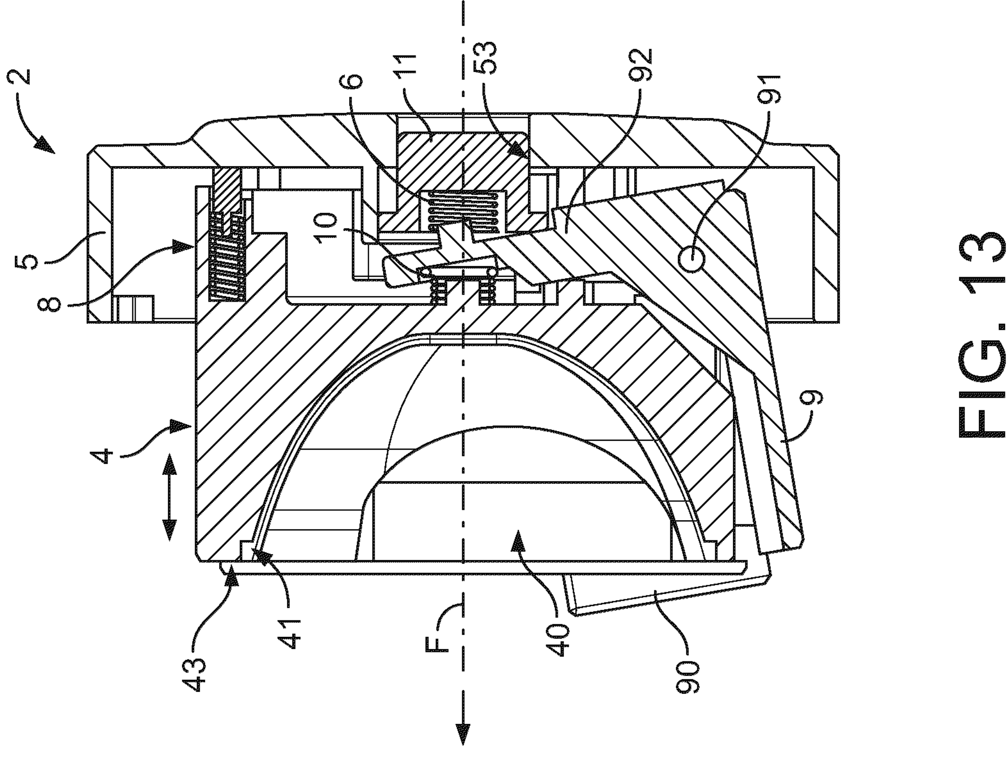
FIG. 13 shows a cross sectional side view along line A-A of FIG. 5 of the capsule holder according to FIG. 12.
Figure 12:
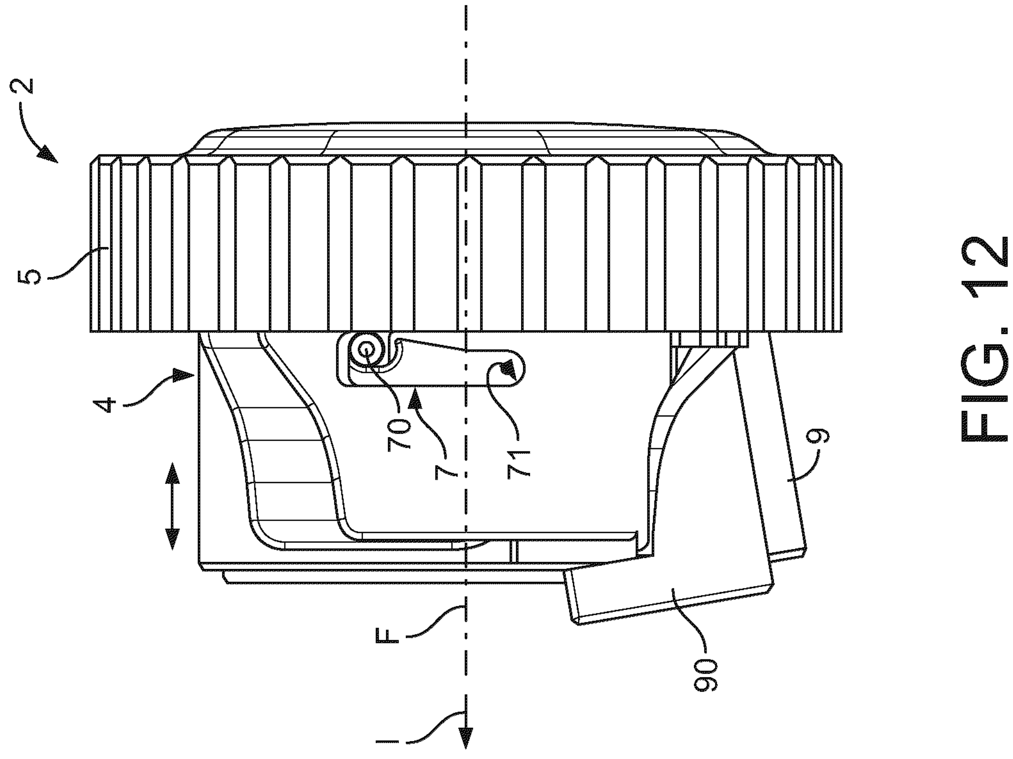
FIG. 12 shows a perspective side view of the capsule holder according to FIG. 5 in the first relative rotational position and with the jaw in the release position.

The holder body 4 can be translationally moveable relative to the lock element 5 between a first translational position (see FIGS. 10 to 13) and a second translational position (see FIGS. 6 to 9), such that the lock element 5 and the holder body 4 are more distant to each other along the attachment direction I in the first translational position than in the second translational position. As can be clearly seen in FIGS. 7 and 9, the lock element 5 and the holder body 4 are preferably in abutment in/along the attachment direction I when being in the second translational position. According to the shown embodiment, here a rear section 42 being opposite to the insertion opening 41 is in abutment with an inner front section 52 of the lock element 5 facing towards the holder body 4, to thus securely position these two elements 4, 5 with respect to each other. This fixed relative position allows for an easy insertion of a capsule C into the capsule holder 2 in a demounted state of the capsule holder 2 with respect to the beverage preparation machine 3 for loading the cavity 40 with a beverage component.

In a preferred embodiment, the holder body 4 is preferably provided to be biased towards the first translational position. Therefore, preferably, a spring member 6 can be provided between the lock element 5 and the holder body 4 as can be seen, for instance, in FIGS. 7, 9, 11 and 13.

The lock element 5 and the holder body 4 are preferably connected to each other so that the holder body 4 is further swivelable, preferably freely swivelable, relative to the lock element 5, preferably at least in the first translational position. Hence, the holder body 4 can be further relatively moveable—i.e. rotatable—with respect to the lock element 5 thus resulting in increased (rotational) degrees of freedom which in turn results in an increased self-alignment function of the capsule holder 2.

The lock element 5 and the holder body 4 may comprise cooperating rotational restriction structures 7 for restricting the rotatable movement between the lock element 5 and the holder body 4, preferably between a mounting position (see, for instance, FIGS. 6 to 9) for mounting the capsule holder 2 to the beverage preparation device 3, e.g. for inserting the capsule holder 2 in the beverage preparation device 3, and a fixing position (see, for instance, FIGS. 10 to 13) in which the capsule holder 2 is fixed to the beverage preparation device 3 by the lock element 5.

The cooperating rotational restriction structures 7 can be configured to allow the holder body 4 to be translationally moveable and, if present, also swivelable relative to the lock element 5 in a first relative rotational position (see, for instance, FIGS. 10 to 13), preferably the fixing position, and restrict or prevent the translational and, if present, the swivelable mobility of the holder body 4 relative to the lock element 5 in a second relative rotational position (see, for instance, FIGS. 6 to 9), preferably the mounting position.

As can be seen, for instance, in FIGS. 6 to 9, in the second relative rotational position, the lock element 5 and the holder body 4 are preferably in the second translational position and thus preferably in abutment in or along the attachment direction I. This allows for an easy handling of the capsule holder 2 and insertion of the capsule C before being attached to the beverage preparation device 3.

The cooperating rotational restriction structures 7 may comprise a pin element 70 provided at one of the lock element 5 and the holder body 4 (here the lock element 5), and a guiding groove 71 to receive the pin element 70 and provided at the other one of the lock element 5 and the holder body 4 (here the holder body 4). The guiding groove 71 here extends in a rotational direction about the fixing axis F. The guiding groove 71 is configured to guide the pin element 70 upon the relative rotational movement between the lock element 5 and the holder body 4.

As can be clearly seen in FIGS. 6, 8, 10, 12 and 4, the guiding groove 71 transversely (e.g. in a direction parallel to the fixing axis F) widens towards the first relative rotational position, and/or the guiding groove 71 transversely (e.g. in a direction parallel to the fixing axis F) tapers towards the second relative rotational position. This shall allow the lock element 5 and the holder body 4 be relatively fixed to each other preferably in the mounting position and allow for the self-alignment function preferably in the and preferably also towards the fixing position.

The lock element 5 and the holder body 4 may further comprise cooperating guiding structures 8 for guiding the relative translational movement between each other. The cooperating guiding structures 8 preferably comprise a guiding pin 80 provided at one of the lock element 5 and the holder body 4 (here the lock element 5), and a guiding recess 81 provided at the other one of the lock element 5 and the holder body 4 (here the holder body 4) for guidably receiving the guiding pin 80. In a preferred embodiment as shown and particularly depicted in FIGS. 7, 9, 11 and 13, the guiding pin 80 and the guiding recess 81 preferably both extend parallel to the attachment direction I thus allowing for a most accurate guidance and a comparably large translational mobility to apply a most effective alignment function.

The capsule holder 2, preferably the holder body 4, may further comprise a jaw 9 for holding a capsule C received in the cavity 40. The jaw 9 can be clearly seen in FIG. 4 and its function is well derivable form a comparison of FIGS. 7 and 9 as well as FIGS. 11 and 13. The jaw 9 preferably comprises a support section 90 partly extending over the insertion opening 41 when seen in the attachment direction I. The capsule C, e.g. with a rim portion R thereof, can be partly positioned between the support section 90 and the holder body 4, here a front face portion 43 surrounding or delimiting the insertion opening 41.

In a more preferred embodiment, the jaw 9 can be connected to the holder body 4 to be moveable, preferably pivotable, between a lock position (see FIGS. 6, 7, 10 and 11) in which the support section 90 partly extends over the insertion opening 41 when seen in the attachment direction Ito hold a capsule C received in the cavity 40, and a release position (see FIGS. 8, 9, 12 and 13) in which the support section 90 clears the insertion opening 41 when seen in the attachment direction I to allow a capsule C received in the cavity 40 be ejected out of the cavity 40 and/or to allow insertion of a capsule C into the cavity 40. The jaw 9 can therefore be connected to the holder body 4 by way of a pivot 91 about which the jaw 9 can be pivoted. Here, the jaw 9, in cross section, can have an L-shaped layout as can be seen in FIGS. 7, 9, 11 and 13.

In a preferred embodiment, the jaw 9 is preferably provided to be biased towards the lock position. Therefore, a spring element 10 is preferably provided between the jaw 9 and the holder body 4, as can be clearly seen in FIGS. 7, 9, 11 and 13. The spring element 10 is here provided at a section of the jaw 9 being most distant and thus opposite to the support section 90—and here thus also opposite to the support section 90 with respect to the pivot 91—to thus allow for a sufficient leverage arm on the one hand and large movement on the other hand so that the support section 90 can be easily moved to clear the insertion opening 41, if desired.

If both are present, the spring element 10 and the spring member 6 can preferably be coaxially arranged, more preferred in a row along the attachment direction I as can be seen, for instance, in FIGS. 7, 9, 11 and 13.

The capsule holder 2 or the lock element 5 may comprise an actuator 11 for moving the jaw 9 to the release position (or even between the release position and the lock position) preferably against the spring force of the spring element 10 and, if present and preferably arranged in a row, maybe also against the one of the spring member 6.

Preferably, the spring member 6, if present, can be supported between the actuator 11 on the one hand and the holder body 4 or the jaw 9 on the other hand. If positioned between the actuator 11 and the jaw 9, the actuator 11 can be pushed into a defined position in a non-operated state and may remain there during the whole loading, alignment and liquid flow operation of the capsule holder 2, i.e. irrespective of the translational position of the holder body 4 with respect to the lock element 5.

The actuator 11 can preferably be supported on or in the lock element 5 by a spring force of the spring element 10 and/or of the spring member 6 when the jaw 9 is in the lock position.

In a preferred embodiment, the actuator 11 can preferably be guidably received in the capsule holder 2, preferably in the lock element 5, to be guided when being moved between the lock position and the release position. This is clearly seen in FIGS. 7, 9, 11 and 13, in which the contour of the actuator 11 corresponds to the contour of a corresponding actuator opening 53 to thus allow for a corresponding relative guidance between these elements 5, 11.

In the following, the beverage preparation machine 1 will be described in more detail.

As already mentioned, the beverage preparation machine 1 comprises the capsule holder 2 according to the present invention and as described for an embodiment of the present invention in detail herein above. The beverage preparation machine 1 further comprises the beverage preparation device 3. The beverage preparation device 3 comprises a receiving section 30 for attaching or receiving the capsule holder 2. Therefore, the receiving section 30 preferably comprises a locking structure 350, like a thread or a part of a bayonet lock structure, which cooperates with the locking structure 50 of the lock element 5. Here, the corresponding locking structures 50, 350 allow for a screw connection so that the capsule holder 2 can be screwed onto and thus towards the beverage preparation device 3.

The beverage preparation device 3 further comprises a liquid delivery device 31 for delivering a liquid, like water, into the cavity 40 of the capsule holder 2 when being attached to the receiving section 30, preferably for preparing a beverage product by interaction with a beverage component carried within the cavity 40 preferably via a capsule C. It is, however, also possible that the liquid delivery device 31 may transfer a liquid for another purpose, like a sanitizing liquid for a sanitization purpose, into the cavity 40 of the capsule holder 2, when being attached, e.g. received in, the receiving section 30 without any capsule C inserted in the capsule holder 2, to thus sanitize the beverage preparation machine 1.

The beverage preparation device 3 further comprises a liquid discharge device 32 for discharging the delivered liquid, preferably the prepared beverage product or the used sanitizing liquid, out of the cavity 40 of the capsule holder 2 when being attached to, e.g. received in, the receiving section 30.

Optionally, the beverage preparation device comprises a gas evacuation device 33 for evacuating a gas, like air, out of the cavity 40 of the capsule holder 2 when being attached to, e.g. received in, the receiving section 30, preferably upon beverage production or liquid delivery into the cavity 40 or, if present, the capsule C.

The liquid delivery device 31 may comprise a storage tank 311 or a liquid connection to an external liquid source to allow the corresponding liquid be provided and delivered to the cavity 40. The liquid delivery device 31 may comprise a liquid delivery outlet 310 extending into the cavity 40, e.g. in the form of a needle protruding into the cavity 40 of the attached or received capsule holder 2. The liquid delivery outlet 310 and the water storage can be connected, for instance, by corresponding liquid lines 312, e.g. in the form of tubes, hoses or the like.

In a similar manner, the gas evacuation device 33 may comprise a gas outlet 330 extending into the cavity 40, e.g. in the form of a needle protruding into the cavity 40 of the attached or received capsule holder 2. The gas evacuation device 33 may further comprise a corresponding fluid connection to an external gas outlet 331 out of the beverage preparation machine 1. The gas outlet 330 and the external gas outlet can be connected, for instance, by corresponding gas lines 332, e.g. in the form of tubes, hoses or the like.

The liquid discharge device 32 may comprise a liquid discharge outlet 320 extending into the cavity 40, e.g. in the form of a needle also protruding into the cavity 40 of the attached or received capsule holder 2. The liquid discharge device 32 may further comprise a dispensing outlet 321 to dispense a produced beverage product or a used sanitizing liquid out of the beverage preparation machine 1. The liquid discharge outlet 320 and the dispensing outlet 321 can be connected, for instance, by a corresponding liquid lines 322, e.g. in the form of tubes, hoses or the like.

Figure 3:
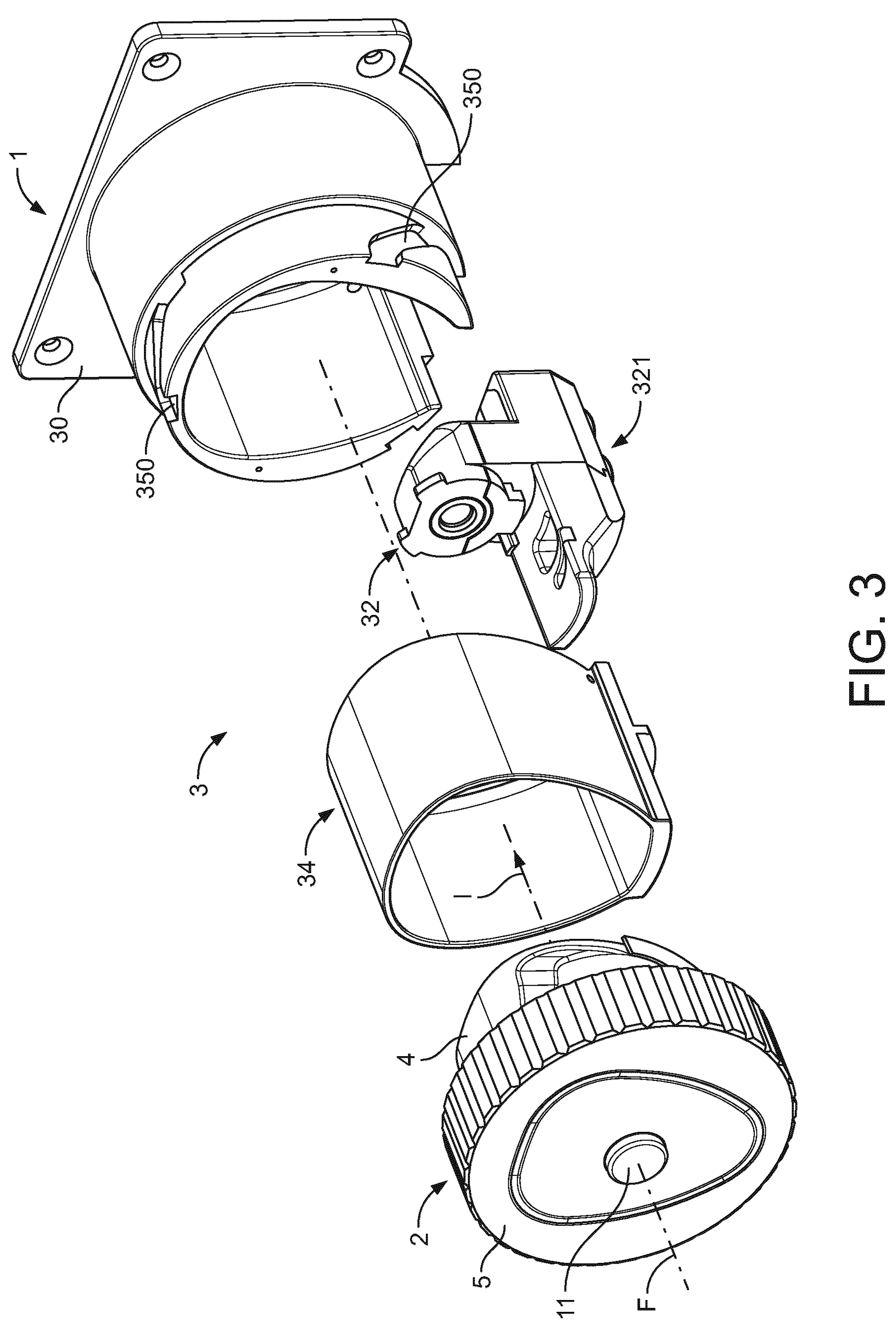
FIG. 3 shows an exploded view of the features depicted in FIG. 1.
Figure 5:
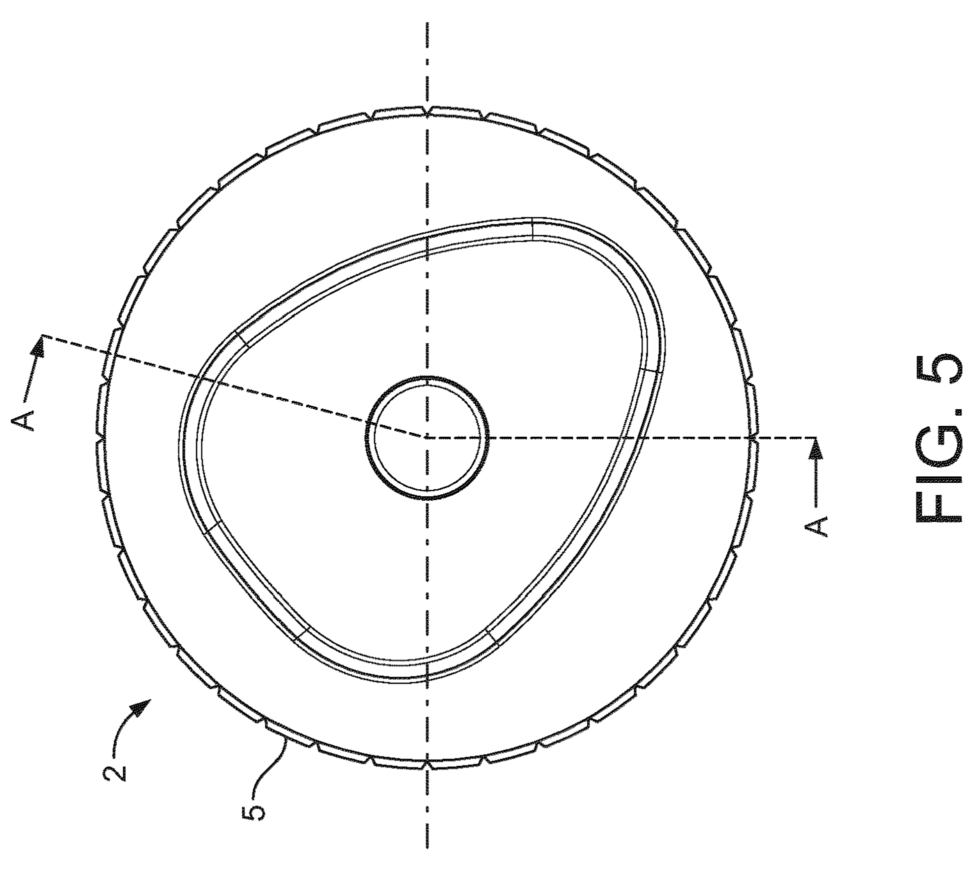
FIG. 5 shows a top view of the capsule holder of FIG. 4.
Figure 4:
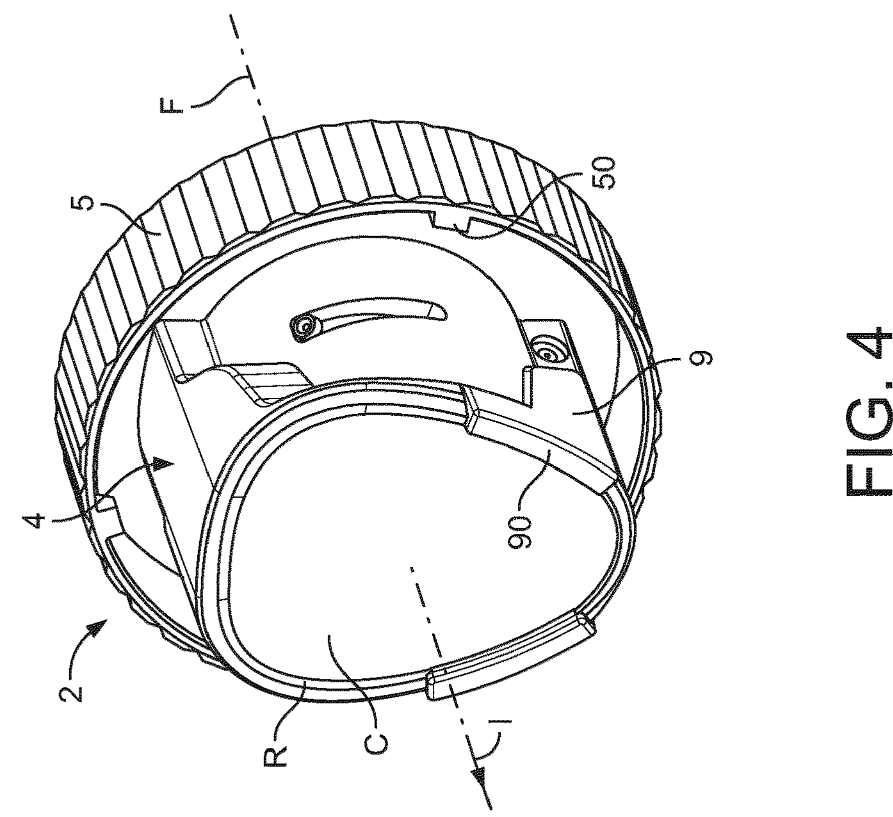
FIG. 4 shows a perspective rear view of a capsule holder of the beverage preparation machine according to FIG. 1.

As can be seen, for instance, in FIGS. 2 and 3, parts of the beverage preparation device 3 can be provided in a demountable manner to thus increase flexibility of the beverage preparation machine 1. Here, the receiving section 30 can be provided in a detachable manner. Also, part of the discharge device 32, here carrying the dispensing outlet 321 as well as the liquid lines 322, can be detachably provided to the receiving section 30. Moreover, liquid dispensing outlet 310, the liquid discharge outlet 320 and, if present, also the gas outlet 330, e.g. in the form of needles, i.e. the corresponding ends of the liquid deliver device 31 and the liquid discharge device 32 as well as the beginning of the gas evacuation device 33, may be carried along with a detachable socket 34. The socket may comprises the contour (i.e. cross-section) of the capsule C or the holder body 4 to allow for a unique attachment orientation of these elements with respect to each other and thus facilitating the assembly thereof.

In the following, a method for delivering a liquid through a beverage preparation machine 1 is described.

In a first step, the beverage preparation machine 1 according to the present invention is provided.

In an optional second step, a capsule C is inserted in the cavity 40 of the capsule holder 2. This is done in case of the beverage preparation machine 1 being used for preparing a beverage. However, if the beverage preparation machine 1 is intended to be sanitized by a sanitizing liquid, like hot water, insertion of a capsule C into the cavity 40 of the capsule holder 2 may be omitted; unless, e.g., the capsule C carries a sanitizing component like a softening agent.

In a third step, the capsule holder 2 is mounted to the receiving section 30, e.g. by being at least partly inserted in the receiving section 30. This is preferably done with the lock element 5 and the holder body 4 in the mounting position. The mounting position also allows for an easier insertion of the capsule C, if any, into the cavity 40 as well as an easier handling of the capsule holder 2 when manipulating the same for being mounted to the receiving section 30.

In a fourth step, the capsule holder 2 is fixed by means of the lock element 5, preferably by a relative rotational movement about the fixing axis F like a screw action, to the beverage preparation device 3, preferably the receiving section 30.

Upon fixing and preferably also mounting of the capsule holder 2, the holder body 4 is aligned to the beverage preparation device 3, preferably the receiving section 30, by the holder body's translational and, if present, also swivelable mobility relative to the lock element 5. This comes about due to a corresponding contact between the capsule holder 2, i.e. the holder body 4, and the beverage preparation device 3, preferably the receiving section 30, upon the translational mounting (e.g. insertion) and fixing movement.

In a fifth step, a liquid, like water for beverage production or a sanitizing liquid, is delivered into the cavity 40 or, if present, into the capsule C within the cavity 40, via the liquid delivery device 31.

In a preferred sixth step, gas, like air, is evacuated out of the cavity 40 of the capsule holder 2 or, if present, the capsule C upon delivery of the liquid or beverage production.

In a seventh step, the delivered liquid, preferably the prepared beverage product or the used sanitizing liquid is discharged out of the cavity 40 of the capsule holder 2 via the liquid discharge device 32.

In an eighth step, after having finished the liquid delivery and discharge, the lock element 5 is released from the beverage preparation device 3, preferably from the receiving section 30, and the capsule holder 2 is removed from the beverage preparation device 3.

In an optional final step, if present, the used capsule C is ejected out of the cavity 40, e.g. by operating the jaw 9 preferably via the actuator 11 to thus clear the insertion opening 41 from the support section 90. Therefore, the actuator 11 can, for instance, be operated by pushing the actuator 11 in the form of a push-button into the lock element 5 preferably against the spring forces of the spring member 6 and/or spring element 10 to thus push the opposite section 92 of the jaw 9 so that the jaw 9 is pivoted about the pivot 91 thus clearing the insertion opening 41 from the support section 90.

The present invention is not limited to the embodiments as described herein above as long as being covered by the appended claims.

The invention claimed is:

1. A capsule holder for holding a capsule carrying a beverage component and for being attachable in an attachment direction to a beverage preparation device of a beverage preparation machine for beverage production, the capsule holder comprising:

a holder body having a cavity configured to receive the capsule via an insertion opening, a lock element for fixing the capsule holder to the beverage preparation device, wherein the lock element and the holder body are connected to each other so that the lock element is rotatably moveable relative to the holder body about a fixing axis, and the holder body is translationally moveable relative to the lock element along the attachment direction, and a jaw for holding the capsule received in the cavity and connected to the holder body to be moveable, wherein the jaw comprises a support section partly extending over the insertion opening in a lock position or clearing the insertion opening in a release position, and wherein the jaw is biased toward the lock position with the lock element comprising an actuator for moving the jaw to the release position.

2. The capsule holder according to claim 1, wherein the holder body is translationally moveable relative to the lock element between a first translational position and a second translational position, such that the lock element and the holder body are more distant to each other along the attachment direction in the first translational position than in the second translational position.

3. The capsule holder according to claim 2, wherein the holder body is biased toward the first translational position such that the holder body self-aligns with the beverage preparation device when capsules of different thickness are inserted in the cavity or when no capsule is inserted in the cavity for sanitization of the beverage preparation device.

4. The capsule holder according to claim 1, wherein the lock element and the holder body are connected to each other so that the holder body is further swivelable, preferably freely swivelable, relative to the lock element.

5. The capsule holder according to claim 1, wherein the lock element and the holder body comprise cooperating rotational restriction structures for restricting the rotatable movement between the lock element and the holder body.

6. The capsule holder according to claim 5, wherein the cooperating rotational restriction structures are configured to allow the holder body to be translationally moveable and, if present, also swivelable relative to the lock element in a first relative rotational position.

7. The capsule holder according to claim 5, wherein the cooperating rotational restriction structures comprise a pin element provided at one of the lock element and the holder body, and a guiding groove provided at the other one of the lock element and the holder body, wherein the guiding groove extends in a rotational direction about the fixing axis and is configured to receive and guide the pin element upon the relative rotational movement between the lock element and the holder body.

8. The capsule holder according to claim 7, wherein the guiding groove transversely widens towards the first relative rotational position, or the guiding groove transversely tapers towards the second relative rotational position.

9. The capsule holder according to claim 1, wherein the lock element and the holder body comprise cooperating guiding structures for guiding the relative translational movement between each other.

10. The capsule holder according to claim 1, wherein the lock element being provided opposite to the insertion opening, and wherein the lock element comprises a locking structure, like a thread or a part of a bayonet lock structure, for fixing the capsule holder to the beverage preparation device by form fit connection.

11. The capsule holder according to claim 1, wherein the fixing axis extends in a direction being parallel to the attachment direction.

12. The beverage preparation machine comprising:

the capsule holder according to claim 1, and the beverage preparation device of the beverage preparation machine being present and having a receiving section for attaching the capsule holder, a liquid delivery device for delivering a liquid into the cavity of the capsule holder when being attached to the receiving section, for preparing a beverage product by interaction with the beverage component carried within the cavity via the capsule, a liquid discharge device for discharging the liquid as a delivered liquid out of the cavity of the capsule holder when being attached to the receiving section, and a gas evacuation device for evacuating gas out of the cavity of the capsule holder when being attached to the receiving section, upon beverage production or liquid delivery into the cavity.

13. The capsule holder according to claim 1, wherein the insertion opening is facing towards the attachment direction, wherein the holder body is configured to be at least partly inserted into the beverage preparation device in the attachment direction.

14. The capsule holder according to claim 1, wherein the lock element is positioned opposite to the insertion opening.

* * * * *